United States Patent
Hong et al.

(10) Patent No.: US 11,330,573 B2
(45) Date of Patent: May 10, 2022

(54) METHOD FOR TRANSMITTING AND RECEIVING SINGLE-CELL MULTI-TRANSMISSION DATA AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 81 days.

(21) Appl. No.: 15/541,792

(22) PCT Filed: Jan. 5, 2016

(86) PCT No.: PCT/KR2016/000053
§ 371 (c)(1),
(2) Date: Jul. 6, 2017

(87) PCT Pub. No.: WO2016/111522
PCT Pub. Date: Jul. 14, 2016

(65) Prior Publication Data
US 2018/0027528 A1     Jan. 25, 2018

(30) Foreign Application Priority Data

Jan. 8, 2015  (KR) .......... 10-2015-0002948
Jan. 4, 2016  (KR) .......... 10-2016-0000376

(51) Int. Cl.
*H04W 72/04* (2009.01)
*H04W 72/00* (2009.01)
*H04W 48/20* (2009.01)
*H04W 4/08* (2009.01)
*H04W 36/08* (2009.01)
(Continued)

(52) U.S. Cl.
CPC .......... *H04W 72/042* (2013.01); *H04W 4/08* (2013.01); *H04W 36/08* (2013.01); *H04W 48/20* (2013.01); *H04W 72/005* (2013.01); *H04W 72/1289* (2013.01); *H04W 36/0009* (2018.08)

(58) Field of Classification Search
None
See application file for complete search history.

(56) References Cited

U.S. PATENT DOCUMENTS

2006/0183498 A1   8/2006  Lee et al.
2010/0189027 A1   7/2010  Ishida et al.
(Continued)

FOREIGN PATENT DOCUMENTS

KR   10-2006-0091184 A   8/2006
KR   10-2012-0100822 A   9/2012
(Continued)

*Primary Examiner* — Saad Khawar
(74) *Attorney, Agent, or Firm* — IP Legal Services, LLC

(57) ABSTRACT

Provided are a method and an apparatus for providing point-to-multipoint transmission in a single cell in a mobile communication network. The method may include receiving system information for single-cell multi-transmission in a primary cell (PCell); receiving single-cell multi-transmission control information in the primary cell; and checking whether a neighboring cell provides a single-cell multi-transmission, using the single-cell multi-transmission control information.

6 Claims, 9 Drawing Sheets

(51) Int. Cl.
*H04W 72/12* (2009.01)
*H04W 36/00* (2009.01)

(56) References Cited

U.S. PATENT DOCUMENTS

| | | | |
|---|---|---|---|
| 2010/0254352 A1* | 10/2010 | Wang | H04W 72/005 |
| | | | 370/332 |
| 2012/0163276 A1 | 6/2012 | Kim et al. | |
| 2012/0163277 A1 | 6/2012 | Kim et al. | |
| 2012/0224522 A1 | 9/2012 | Kim et al. | |
| 2013/0107864 A1* | 5/2013 | Lee | H04W 36/0007 |
| | | | 370/331 |
| 2013/0121133 A1* | 5/2013 | Anchan | H04W 4/06 |
| | | | 370/216 |
| 2013/0195003 A1 | 8/2013 | Lee et al. | |
| 2014/0126457 A1 | 5/2014 | Gou et al. | |
| 2014/0161020 A1 | 6/2014 | Jung et al. | |
| 2014/0286222 A1* | 9/2014 | Yu | H04L 12/185 |
| | | | 370/312 |
| 2014/0286225 A1 | 9/2014 | Yu et al. | |
| 2015/0071157 A1 | 3/2015 | Jung et al. | |
| 2016/0374050 A1* | 12/2016 | Prasad | H04L 12/1868 |
| 2017/0094569 A1* | 3/2017 | Urabayashi | H04W 36/08 |

FOREIGN PATENT DOCUMENTS

| | | |
|---|---|---|
| KR | 10-2013-0019732 A | 2/2013 |
| KR | 10-2013-0059378 A | 6/2013 |
| KR | 10-2014-0031338 A | 3/2014 |
| KR | 10-2014-0145146 A | 12/2014 |
| WO | 2013/151360 A1 | 10/2013 |

* cited by examiner

METHOD FOR TRANSMITTING AND RECEIVING SINGLE-CELL MULTI-TRANSMISSION DATA AND APPARATUS THEREFOR

CROSS REFERENCE TO RELATED APPLICATIONS

This application is a National Stage Patent Application of PCT International Patent Application No. PCT/KR2016/000053 (filed on Jan. 5, 2016) under 35 U.S.C. § 371, which claims priority to Korean Patent Application Nos. 10-2015-0002948 (filed on Jan. 8, 2015), and 10-2016-0000376 (filed on Jan. 4, 2016), the teachings of which are incorporated herein in their entireties by reference.

TECHNICAL FIELD

The present disclosure relates to a technique for transmitting and receiving single-cell multi-transmission data. More particularly, the present disclosure relates to a method and an apparatus for providing point-to-multipoint transmission in a single cell in a mobile communication network.

BACKGROUND ART

3GPP Long Term Evolution (LTE) adopts Group Communication System Enablers (GCSE) in order to transmit data to a plurality of user equipments (UEs) in need of emergency communication, such as in a public disaster.

Here, 3GPP Release 12 uses the Multimedia Broadcast Multicast Service (MBMS) to enable a group of UEs to receive group communication.

The MBMS is designed to provide media content for a mobile TV or the like in a large-scale pre-planned area (for example, an MBSFN area). An MBSFN area is somewhat static. Further, the MBSFN area may not be dynamically adjusted depending on user distribution. MBMS transmission occupies the entire system bandwidth. Further, MBMS transmission does not allow unicast and multiplexing in the same subframe, even though not all radio resources are used in a frequency domain.

As described above, the MBMS occupies the entire system bandwidth and is static. Thus, the MBMS may not be dynamically adjusted depending on the number of groups or the traffic load of a group. This results in inefficiency in a base station transmitting group communication data to a plurality of UEs.

DETAILED DESCRIPTION OF THE INVENTION

Technical Problem

The present disclosure has been made in view of the above-mentioned problems and aims to propose a method and an apparatus for dynamically transmitting and receiving multi-transmission data through a physical downlink shared channel (PDSCH) when transmitting and receiving the multi-transmission data to a group including a plurality of user equipments (UEs) in a single cell.

The present disclosure also aims to propose a method and an apparatus for transmitting and receiving multi-transmission data through a PDSCH, while minimizing group communication service interruptions occurring due to the cell-to-cell movement of a UE.

Technical Solution

To address the foregoing problems, the present disclosure provides a method for receiving, by a user equipment (UE), single-cell multi-transmission data, the method including: receiving system information for single-cell multi-transmission in a primary cell (PCell); receiving single-cell multi-transmission control information in the primary cell; and identifying whether a neighboring cell provides single-cell multi-transmission using the single-cell multi-transmission control information.

Further, the present disclosure provides a method for transmitting, by a base station, single-cell multi-transmission data, the method including: transmitting system information for single-cell multi-transmission in a primary cell (PCell); generating single-cell multi-transmission control information; and transmitting the single-cell multi-transmission control information to a UE in the primary cell.

The present disclosure also provides a UE apparatus for receiving single-cell multi-transmission data, the UE apparatus including: a receiver configured to receive system information for single-cell multi-transmission in a primary cell (PCell) and to receive single-cell multi-transmission control information in the primary cell; and a controller configured to identify whether a neighboring cell provides single-cell multi-transmission, using the single-cell multi-transmission control information.

In addition, the present disclosure provides a base station apparatus for transmitting single-cell multi-transmission data, the base station apparatus including: a controller configured to generate single-cell multi-transmission control information; and a transmitter configured to transmit system information for single-cell multi-transmission in a primary cell (PCell) and to transmit the single-cell multi-transmission control information to a UE in the primary cell.

Advantageous Effects

As described above, the present disclosure enables multi-transmission data to be dynamically transmitted to and received from a group including a plurality of UEs in a single cell through a PDSCH, thereby efficiently using radio resources.

Further, the present disclosure provides an effect of transmitting and receiving multi-transmission data through a PDSCH, while minimizing the occurrence of group communication service interruptions due to the cell-to-cell movement of a UE.

MODE FOR CARRYING OUT THE INVENTION

Figure 1:
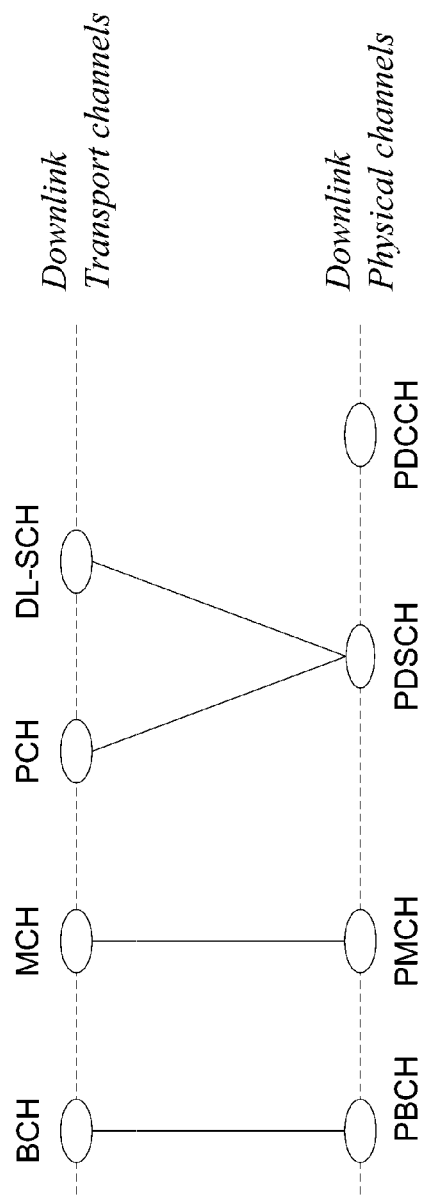
FIG. 1 illustrates mapping between downlink transport channels and downlink physical channels.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, an machine type communication (MTC) terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release 12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another to enable the devices that provide a predetermined wireless area to be controlled by an identical entity or to cooperatively configure the wireless area, may be indicated as a base station. Based on a configuration type of a wireless area, an eNB, an remote radio head (RRH), an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The present disclosure relates to a method and an apparatus for transmitting and receiving single-cell multi-transmission data.

In a conventional E-UTRAN, group UEs need to use a static area or static radio resource configuration in order to receive group communication data (downlink multicast or group cast) using a Multimedia Broadcast Multicast Service (MBMS). To eliminate such inefficiency, a method of receiving the same downlink data through a PDSCH in a multicast mode may be considered. However, a specific procedure for a plurality of group UEs to receive downlink data through a PDSCH has not been provided. Further, a method of receiving downlink group communication data through a PDSCH may independently occur in each cell, thus failing to guarantee service continuity when a cell is changed by the movement of a UE. To solve the foregoing problems, the present disclosure is devised to provide a method and an apparatus for receiving downlink group communication data through a PDSCH. In addition, the present disclosure provides a method and an apparatus capable of receiving group communication data through a PDSCH, while minimizing service interruptions occurring due to the cell-to-cell movement of a UE.

FIG. 1 illustrates mapping between downlink transport channels and downlink physical channels. Referring to FIG. 1, a PDSCH physical channel may currently be used only to carry DL-SCH and PCH transport channels.

Figure 2:
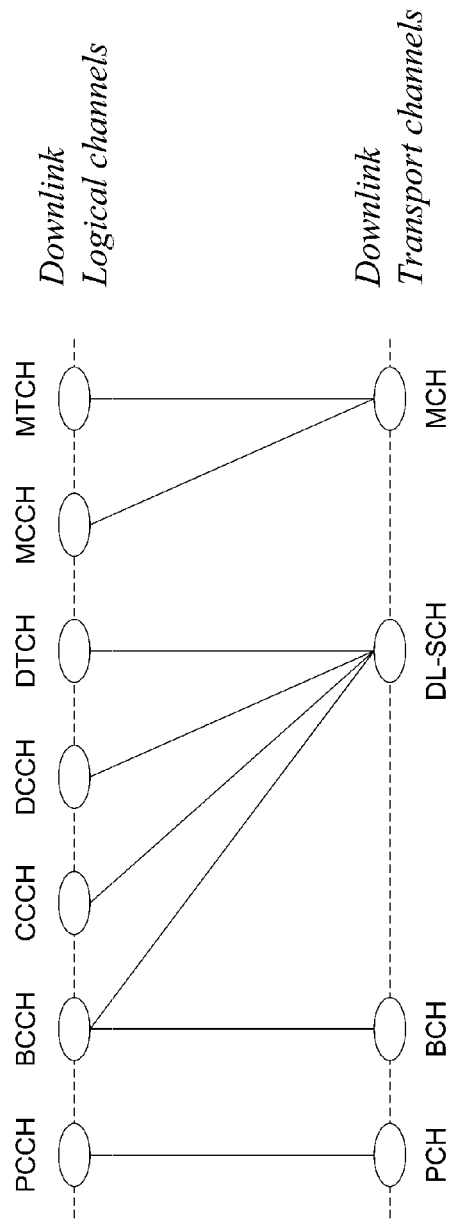
FIG. 2 illustrates mapping between downlink logical channels and downlink transport channels.

FIG. 2 illustrates mapping between downlink logical channels and downlink transport channels. Referring to FIG. 2, a DL-SCH transport channel may be mapped to and transport BCCH, CCCH, DCCH, and DTCH logical channels.

A PCCH is used to transmit paging information and system information change notification. For example, for an idle-mode UE to receive paging, when the UE wakes up in a corresponding paging occasion and detects a P-RNTI transmitted on a PDCCH addressing a paging message, the UE may perform operation to receive a corresponding downlink paging message transmitted on a PCH.

A BCCH is used for broadcasting system control information. For example, a Master Information Block (MIB) on a BCCH logical channel is mapped to a BCH and is transmitted through a PBCH. In another example, a System Information Block (SIB) other than SIB1 on the BCCH logical channel is mapped to a system information message (SI message) and is transmitted through a DL-SCH. Mapping of the SIB other than SIB1 to the SI message is flexible and is indicated by SIB1. A UE needs to acquire SIB1 in order to identify how other SIBs are scheduled. Each SIB is included in a single SI message, and a single SI message may include a plurality of SIBs having the same period. An SI message is dynamically scheduled. An SI message may be transmitted within a periodic time window called an SI-window. Each SI message is associated with one SI-window, and other SI messages are broadcast on other non-overlapping SI-windows. When SIB1 and an SI message are broadcasted on a DL-SCH, a PDCCH associated with the DL-SCH uses a single SI-RNTI to address SIB1 and all SI messages within one cell. The UE decodes the SI-RNTI on the PDCCH within the SI-window to acquire a detailed schedule of system information in the SI-window.

A CCCH is used to transmit control information connected to random access of UEs having no RRC connection. An RRC message on a CCCH may be repeatedly received since MAC HARQ retransmission may be performed.

A DCCH is a point-to-point channel used to transmit dedicated control information for UEs having an RRC connection. A DTCH is a point-to-point channel dedicated to a UE, used for the transmission of user information.

A UE receives a downlink assignment through a PDCCH masked with a C-RNTI of the UE. Downlink assignment indicates HARQ information and information on a radio resource on an assigned PDSCH.

Figure 3:
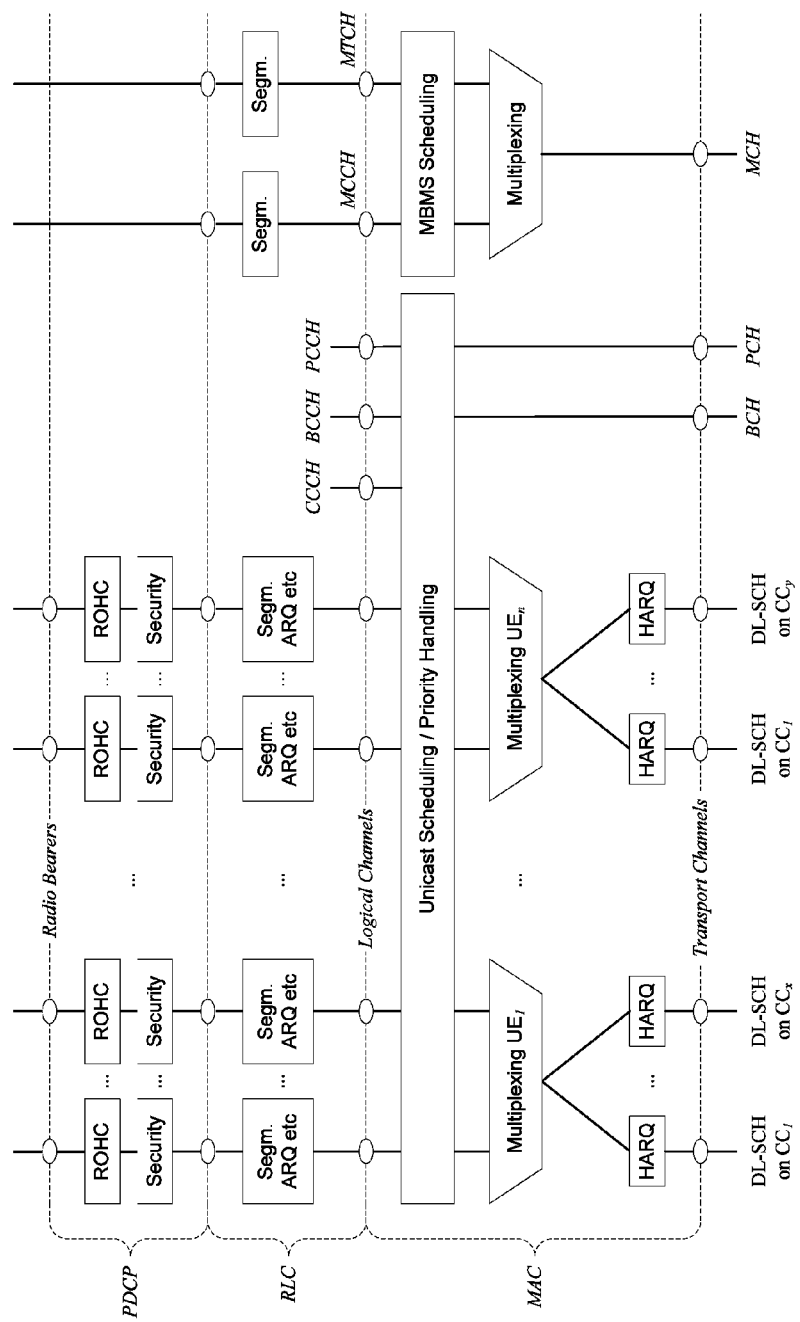
FIG. 3 illustrates a layer 2 structure for a downlink with carrier aggregation (CA) configured.

FIG. 3 illustrates a layer 2 structure for a downlink with carrier aggregation (CA) configured.

As described, a PDSCH may be used to receive dedicated information for a specified UE and common information for the specified UE. To this end, a UE-specific identifier (for example, a C-RNTI) for the UE is needed. Further, the PDSCH may be used to receive paging information and common information for all UEs or a group of UEs. To this end, a common group identifier (for example, a P-RNTI and an SI-RNTI) is needed. In an E-UTRAN, FFFE as a P-RNTI value and FFFF as an SI-RNTI value are used.

In the present disclosure, single-cell multi-transmission denotes transmitting data through a PDSCH radio resource shared among UEs included in a specified group in one cell, and single-cell multi-transmission data indicates downlink multicast, group cast or group communication data transmitted through a PDSCH radio resource shared among UEs included in a specified group in one cell is referred to as. Further, group communication denotes a communication mode of transmitting and receiving data through single-cell multi-transmission.

In addition, a group-specific identifier (group-specific RNTI) assigned to a specified group to transmit single-cell multi-transmission data is referred to as group identification information (Group-RNTI: G-RNTI). A service provided for UEs through group communication is referred to as a group communication service, and information to identify each group communication service, group communication session, or group communication bearer is referred to as group communication service identification information (Temporary Mobile Group Identity: TMGI). Furthermore, a UE interested in group communication, a UE interested in group communication through single-cell multi-transmission, and a UE capable of single-cell multi-transmission are commonly referred to as a UE interested in group communication.

Meanwhile, a UE needs information to identify a single-cell multi-transmission control message transmitted by a base station, and such information is defined as a Single-Cell RNTI (SC-RNTI). A UE may identify single-cell multi-transmission control information using an SC-RNTI. A single-cell multi-transmission control message includes control information for single-cell multi-transmission.

The terms mentioned above are provided for the convenience of understanding and are not for restrictive purposes.

A UE interested in group communication may be made aware of a TMGI to identify a specified group communication service of interest by an application server (for example, GCS AS or BM-SC). Alternatively, TMGIs to identify specified group communication services of interest may be configured in advance in a UE.

One of an MBMS, single-cell multi-transmission, and a unicast bearer may be used for downlink transmission for a group communication service. Further, a unicast bearer may be used for uplink transmission.

In the use of an MBMS, an MBMS bearer configured in advance between a Broadcast/Multicast Service Center (BM-SC) and base stations may be used to set up a group communication service/session/bearer. Alternatively, an MBMS bearer may be configured for use between the BM-SC and base stations through an activate MBMS bearer procedure upon a request from a Group Communication Service Application Server (GCS AS). One or more pieces of information among a TMGI to identify a downlink MBMS bearer service for group communication, an MBMS Session Identity (ID) to identify each MBMS session, MBSFN area identification information, and identification information to identify a downlink service/session/bearer of a group communication service/session/bearer are assigned by the BS-SC, the GCS AS, or another Evolved Packet System (EPS) entity, and may be provisioned for a UE by an EPS entity controlling group communication (for example, GCS AS, IMS, PCRF, or other EPS entities) or by an EPS entity controlling registration (or authentication or confirmation). To receive downlink transmission for group communication using an MBMS, the UE may register in the GCS AS, the EPS entity controlling group communication, or the EPS entity controlling registration (or authentication or confirmation). According to another method, a TMGI to identify a downlink MBMS bearer service for group communication, an MBMS Session Identity (ID) to identify each MBMS session, MBSFN area identification information, and group identification information for group communication may be configured in advance in the UE. When the GCS AS or the EPS entity controlling group communication determines to provide downlink transmission for group communication through an MBMS in specified cells, the GCS AS, the EPS entity controlling group communication, or the EPS entity controlling registration (or authentication or confirmation) may start an MDMS session for base stations through the BM-SC.

In the use of single-cell multi-transmission, a base station assigns a G-RNTI to provide a specified group communication service through single-cell multi-transmission. The G-RNTI may be associated with a TMGI. Alternatively, the G-RNTI may be associated with a TMGI and/or MBMS session ID. Alternatively, the G-RNTI may be associated with a downlink service of a group communication service. Alternatively, the G-RNTI may be associated with identification information to identify a downlink service/session/bearer of a group communication service/session/bearer.

Figure 4:
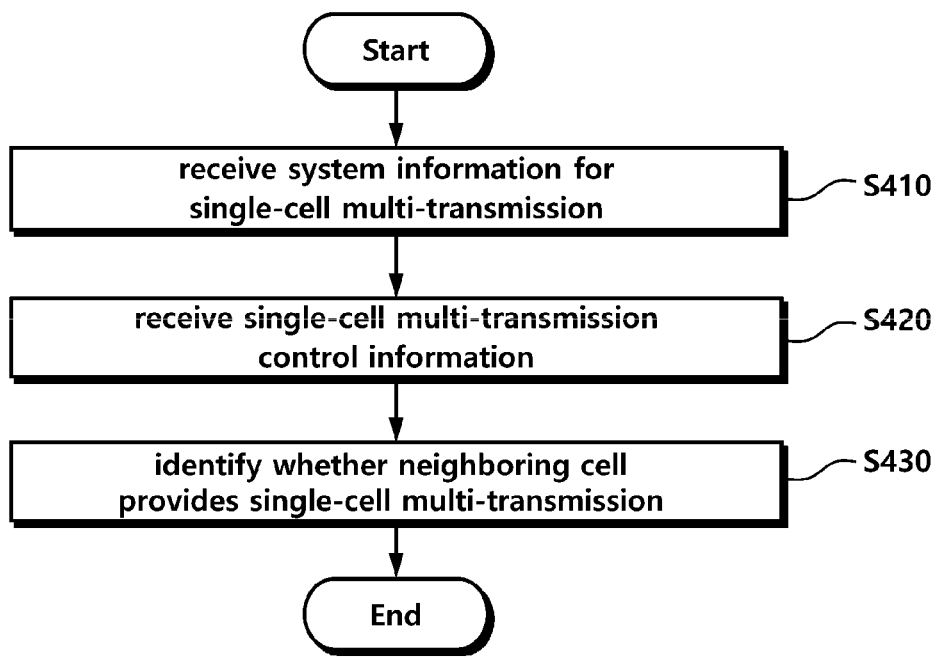
FIG. 4 illustrates an operation of a user equipment (UE) according to one embodiment of the present disclosure.

FIG. 4 illustrates an operation of a UE according to one embodiment of the present disclosure.

The present disclosure discloses a method of a UE for receiving single-cell multi-transmission data. The method may include receiving system information for single-cell multi-transmission in a primary cell (PCell), receiving single-cell multi-transmission control information in the PCell, and identifying, using the single-cell multi-transmission control information, whether a neighboring cell provides single-cell multi-transmission.

Referring to FIG. 4, the UE receives system information for single-cell multi-transmission in a PCell (S410). For example, a base station may transmit system information for single-cell multi-transmission through the PCell configured for the UE, and the UE may receive the system information for single-cell multi-transmission. For example, the base station may broadcast information on single-cell multi-transmission through the system information. Specifically, the base station may broadcast a G-RNTI through the system information. Alternatively, the base station may broadcast a TMGI and a G-RNTI associated with the TMGI through the system information. Alternatively, the base station may broadcast identification information to identify a downlink service/session/bearer of a group communication service/session/bearer and a G-RNTI associated with the identification information through the system information. In another example, the base station may broadcast information for receiving single-cell multi-transmission control information including a G-RNTI through the system information.

Alternatively, the base station may broadcast information for receiving single-cell multi-transmission control information including a TMGI and a G-RNTI associated with the TMGI through the system information. Alternatively, the base station may broadcast information for receiving single-cell multi-transmission control information including identification information to identify a downlink service/session/bearer of a group communication service/session/bearer and a G-RNTI associated with the identification information through the system information. Thus, the UE may recognize the G-RNTI for group communication. The UE may receive the system information to identify whether the cell provides single-cell multi-transmission and to identify a group communication service provided by the cell.

Further, the UE receives single-cell multi-transmission control information in the PCell (S420). The single-cell multi-transmission control information may be scheduled based on the system information for single-cell multi-transmission. For example, the UE may receive the system information in operation S410 to identify a period for transmitting single-cell multi-transmission control information and an offset. That is, the UE may receive the single-cell multi-transmission control information scheduled based on the system information.

Meanwhile, the single-cell multi-transmission control information may include information on a neighboring cell providing single-cell multi-transmission. Alternatively, the single-cell multi-transmission control information may include information on a group communication service provided by each cell. Alternatively, the single-cell multi-transmission control information may include correspondence information on matching of a group communication service and a neighboring cell. For example, the single-cell multi-transmission control information may include at least one of cell identification information on a neighboring cell providing single-cell multi-transmission, a TMGI, and information on a neighboring cell providing single-cell multi-transmission associated with a G-RNTI. Accordingly, the UE may acquire information on a neighboring cell providing a group communication service of interest. Alternatively, the UE may identify information on a neighboring cell providing single-cell multi-transmission. The single-cell multi-transmission control information may be indicated through a PDCCH.

Further, the UE identifies whether a neighboring cell provides single-cell multi-transmission using the single-cell multi-transmission control information (S430). The UE may identify whether the neighboring cell provides single-cell multi-transmission using the received single-cell multi-transmission control information. Alternatively, the UE may identify what kind of group communication service the neighboring cell provides. Alternatively, the UE may identify a neighboring cell providing a group communication service that the UE is interested in. Alternatively, the UE may identify a cell providing single-cell multi-transmission. Accordingly, the UE may identify whether the neighboring cell provides single-cell multi-transmission or provides a group communication that interests the UE without checking system information on the neighboring cell.

Meanwhile, the UE may receive single-cell multi-transmission data using a G-RNTI. For example, the UE may receive single-cell multi-transmission data through a PDSCH radio resource. Other UEs in the same group as the UE may receive the single-cell multi-transmission data through the shared PDSCH radio resource, and the UE may receive scheduling information on the PDSCH through a PDCCH region to receive the single-cell multi-transmission data through the PDSCH radio resource. Meanwhile, the UE may identify whether the single-cell multi-transmission data is about a group communication service in which the UE is interested using the assigned G-RNTI.

As described above, the UE of the present disclosure may receive single-cell multi-transmission data on a group communication service through a PDSCH region and may identify whether a neighboring cell provides single-cell multi-transmission through a servicing cell. The UE may identify whether the single-cell multi-transmission is provided or whether the group communication service is provided, thus continuously receiving the single-cell multi-transmission data while moving.

Figure 5:
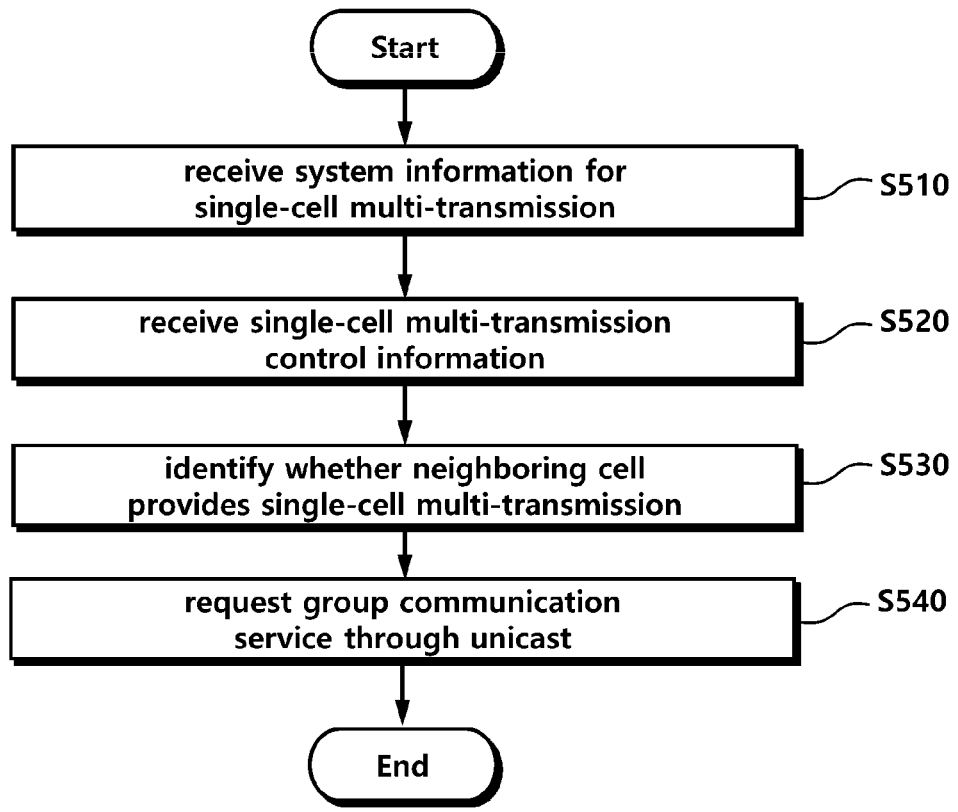
FIG. 5 illustrates an operation of a UE according to another embodiment of the present disclosure.

FIG. 5 illustrates an operation of a UE according to another embodiment of the present disclosure.

In accordance with at least one embodiment, the UE may request receipt of a group communication service through unicast when a neighboring cell provides no single-cell multi-transmission.

Referring to FIG. 5, as described with reference to S410 to S430, the UE may receive system information for single-cell multi-transmission in a PCell (S510) and may receive single-cell multi-transmission control information in the PCell (S520). A base station may broadcast a G-RNTI through the system information. Alternatively, the base station may broadcast a TMGI and a G-RNTI associated with the TMGI through the system information. Alternatively, the base station may broadcast identification information to identify a downlink service/session/bearer of a group communication service/session/bearer and a G-RNTI associated with the identification information through the system information. In another example, the base station may broadcast information for receiving single-cell multi-transmission control information including a G-RNTI through the system information. Alternatively, the base station may broadcast information for receiving single-cell multi-transmission control information including a TMGI and a G-RNTI associated with the TMGI through the system information. Alternatively, the base station may broadcast information for receiving single-cell multi-transmission control information including identification information to identify a downlink service/session/bearer of a group communication service/session/bearer and a G-RNTI associated with the identification information through the system information.

The single-cell multi-transmission control information may be scheduled based on the system information for single-cell multi-transmission. For example, the UE may receive the system information to identify a period for transmitting single-cell multi-transmission control information and an offset. That is, the UE may receive the single-cell multi-transmission control information at a time scheduled by the system information. Meanwhile, the single-cell multi-transmission control information may include information on a neighboring cell providing single-cell multi-transmission. Alternatively, the single-cell multi-transmission control information may include information on a group communication service provided by each cell. Alternatively, the single-cell multi-transmission control information may include information on correspondence between a group communication service and a cell. For example, the single-cell multi-transmission control information may include at least one of cell identification information on a neighboring cell providing single-cell multi-transmission, a TMGI, and information on a neighboring cell providing single-cell multi-transmission associated with a G-RNTI.

The UE may identify whether a neighboring cell provides single-cell multi-transmission using the single-cell multi-transmission control information (S530). The UE may identify whether the neighboring cell provides single-cell multi-transmission using the received single-cell multi-transmission control information. Alternatively, the UE may identify what kind of group communication service the neighboring cell provides. Alternatively, the UE may identify a neighboring cell providing a group communication service that the UE is interested in. Alternatively, the UE may identify a cell providing single-cell multi-transmission.

When the neighboring cell does not provide single-cell multi-transmission, the UE may request receipt of a group communication service through unicast before a cell change (S540). For instance, as a result of identifying the control information, when the neighboring cell, to which the UE intends to move, does not provide single-cell multi-transmission for a group communication service in which the UE is interested, the UE may request a group communication service through unicast directly through the GCS AS. For example, the UE may request a group communication service through unicast while receiving the group communication service through single-cell multi-transmission in the Pcell. In another example, the UE, which is RRC-connected, may request a group communication service through unicast directly through the GCS AS. In still another example, the UE, which is RRC-idle, may establish an RRC connection and then may request a group communication service through unicast through the GCS AS. The end-to-end delay for media delivery using a unicast bearer is about 40 ms. Meanwhile, the end-to-end delay for media delivery using an MBMS MRB is about 160 ms. Thus, to provide service continuity, if the neighboring cell, to which the UE intends to move, does not support single-cell multi-transmission, the UE first requests a service through unicast even though the neighboring cell supports an MBMS (or group communication through an MBMS or an MBSFN providing the same service), thereby reducing service interruptions. Subsequently, the UE moves to the target cell and may receive a group communication service through an MBMS.

Figure 6:
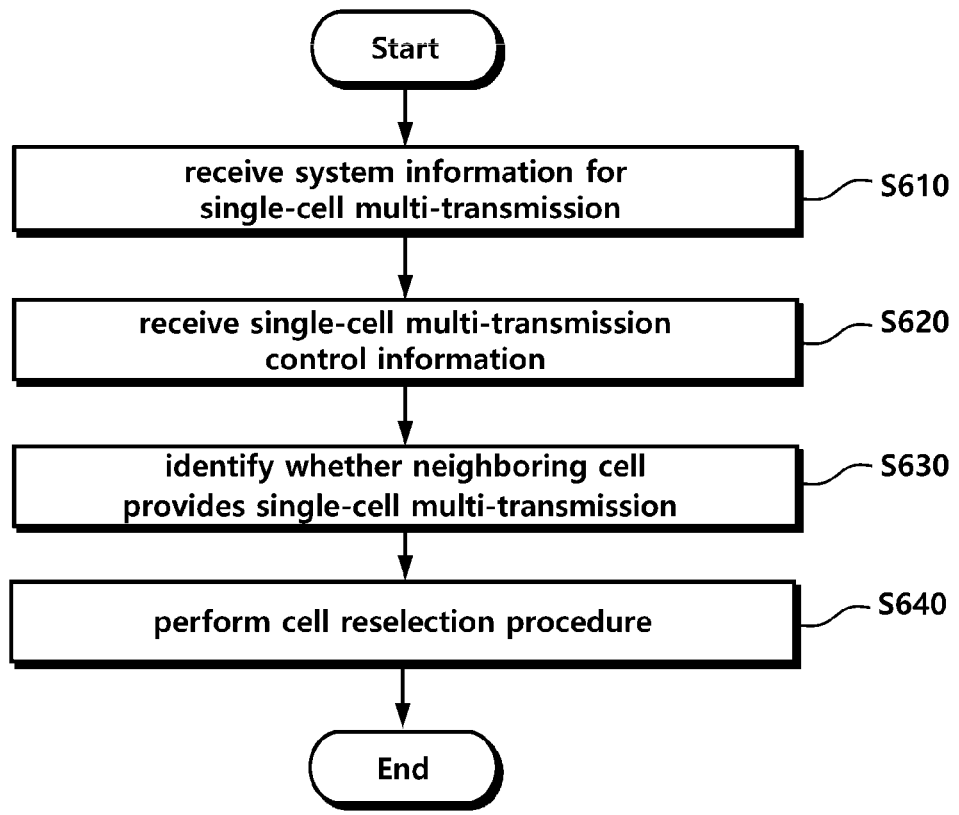
FIG. 6 illustrates an operation of a UE according to still another embodiment of the present disclosure.

FIG. 6 illustrates an operation of a UE according to still another embodiment of the present disclosure.

In accordance with at least one embodiment, the UE may perform a cell reselection procedure by assigning a top priority to the frequency of a cell providing single-cell multi-transmission.

Referring to FIG. 6, as described with reference to FIGS. 4 and 5, the UE may receive system information for single-cell multi-transmission in a PCell (S610) and may receive single-cell multi-transmission control information in the PCell (S620). The UE may identify through the received control information whether a neighboring cell provides single-cell multi-transmission (S630).

The UE in a RRC-idle state may perform a cell reselection procedure by assigning a top priority to the frequency of a cell providing single-cell multi-transmission (S640). The UE may receive single-cell multi-transmission data in the PCell. Alternatively, the UE may move to a neighboring cell providing single-cell multi-transmission to receive single-cell multi-transmission data. In this case, the UE may assign a top priority to the frequency of a cell providing single-cell multi-transmission in performing cell reselection. For example, in cell reselection, unlike handover, a frequency is detected and selected according to priorities assigned to frequencies. Thus, the UE, which is receiving or is expected to receive a group communication service using single-cell multi-transmission, may select a cell not providing single-cell multi-transmission according to priorities assigned to frequencies in cell reselection. To solve this problem, the UE may assign a top priority to the frequency of a cell providing a group communication service which the UE is interested in or is receiving in the cell reselection procedure, thereby preventing the group communication service from being interrupted according to the cell reselection procedure. A specific priority-assigning method is described in detail below.

Hereinafter, specific embodiments of operations of a UE and a base station illustrated in FIGS. 4 to 6 are described in detail.

The base station may broadcast information on single-cell multi-transmission through system information. For one example, the base station may broadcast a G-RNTI. In another example, the base station may broadcast a TMGI and a G-RNTI associated with the TMGI. In still another example, the base station may broadcast identification information to identify a downlink service/session/bearer of a group communication service/session/bearer and a G-RNTI associated with the identification information. In yet another example, the base station may broadcast information for receiving single-cell multi-transmission control information including a G-RNTI. In still another example, the base station may broadcast information for receiving single-cell multi-transmission control information including a TMGI and a G-RNTI associated with the TMGI. In yet another example, the base station may broadcast information for receiving single-cell multi-transmission control information including identification information to identify a downlink service/session/bearer of a group communication service/session/bearer and a G-RNTI associated with the identification information. Therefore, the UE interested in corresponding group communication may identify the G-RNTI of the group communication service.

When the UE interested in group communication that receives (or is receiving) downlink transmission of specified group communication transmitted through single-cell multi-transmission moves between cells (or between base stations or to another base station cell), service continuity needs to be provided to reduce service interruptions. Methods for providing service continuity in respective scenarios are described below.

Scenario 1: UE Moving from Cell Supporting Single-Cell Multi-Transmission to Cell Not Supporting Single-Cell Multi-Transmission While staying in a source cell, the UE may identify whether a neighboring cell, to which the UE intends to move, supports single-cell multi-transmission based on single-cell multi-transmission system information on the neighboring cell, control information associated with the single-cell multi-transmission system information, or control information for identifying whether the neighboring cell supports single-cell multi-transmission.

When the neighboring cell, to which the UE intends to move, does not support single-cell multi-transmission, the UE may request a service through unicast, while receiving a service through single-cell multi-transmission in the source cell. The UE, which is RRC-connected, may request the service through unicast directly through a GCS AS. The UE in a RRC-idle state may establish an RRC connection and request the service through unicast through the GCS AS.

The end-to-end delay for media delivery using a unicast bearer is about 40 ms. Meanwhile, the end-to-end delay for media delivery using an MBMS MRB is about 160 ms. Thus, to provide service continuity, if the neighboring cell, to which the UE intends to move, does not support single-cell multi-transmission, the UE first requests a service through unicast even though the neighboring cell supports an MBMS (or group communication through an MBMS or an MBSFN providing the same service), thereby reducing service interruptions. Subsequently, the UE moves to a target cell and may receive group communication through an MBMS.

When the UE moves from the single-cell multi-transmission cell to a cell not supporting single-cell multi-transmission, the UE may experience a short service interruption. According to another method for avoiding or mitigating the service interruption, when the UE receives single-cell multi-transmission, the source cell (or source base station) may forward data transferred through a BM-SC (or GCS AS or random group communication data transmission entity) to the target cell (target base station).

For instance, when the target cell/base station receives group communication data transferred through the BM-SC (or GCS AS or random group communication data transmission entity) through the source cell/base station, the target base station may transmit the data to the UE. For example, the target base station may transmit the data through single-cell multi-transmission. To this end, the target base station may receive and use a G-RNTI from the source base station via a handover preparation message. In preparation for handover, a data-forwarding tunnel for the data may be configured. In another example, the target base station may transmit the data through a data radio bearer of the UE. In preparation for handover, a data-forwarding tunnel for the data may be configured.

Scenario 2: UE Moving from Single-Cell Multi-Transmission Transmitting Cell to Single-Cell Multi-Transmission Transmitting Cell While staying in a source cell, the UE may identify whether a neighboring cell, to which the UE intends to move, supports single-cell multi-transmission based on single-cell multi-transmission system information on the neighboring cell, control information associated with the single-cell multi-transmission system information, or control information for identifying whether the neighboring cell supports single-cell multi-transmission.

Hereinafter, embodiments for providing service continuity for the RRC-idle UE are described in detail.

According to one method for providing service continuity for the RRC-idle UE, single-cell multi-transmission information on a specified group communication service/session/bearer of a neighboring cell or neighboring base station (hereinafter, referred to as a neighboring cell) may be provided through X2 signaling (for example, an X2 setup and eNB configuration update procedure) and/or Operation, Administration and Maintenance (OAM).

When the single-cell multi-transmission system information on the neighboring cell, the control information associated with the single-cell multi-transmission system information, or the control information for identifying whether the neighboring cell supports single-cell multi-transmission is received, the base station may broadcast single-cell multi-transmission information on neighboring cells through the single-cell multi-transmission system information, the control information associated with the single-cell multi-transmission system information, or the control information for identifying whether the neighboring cell supports single-cell multi-transmission, thereby supporting service continuity for the UE.

Detailed information included in the single-cell multi-transmission information on the neighboring cells included in the foregoing X2 signaling and/or the single-cell multi-transmission system information, the control information associated with the single-cell multi-transmission system information, or the control information for identifying whether the neighboring cell supports single-cell multi-transmission, which is to be broadcast and may be provided through OAM, may include cell identification information, a TMGI, a G-RNTI, and identification information to identify a downlink service/session/bearer of a group communication service/session/bearer.

The UE interested in group communication may avoid reading single-cell multi-transmission system information or relevant control information in neighboring cells or at neighboring frequencies through the system information, control information associated with the single-cell multi-transmission system information, or control information for identifying whether the neighboring cell supports single-cell multi-transmission. Alternatively, the UE interested in group communication may be made aware of whether single-cell multi-transmission is provided, which group communication service is provided, or which group communication service is provided through single-cell multi-transmission, through the foregoing system information, control information associated with the single-cell multi-transmission system information, or control information for identifying whether the neighboring cell supports single-cell multi-transmission.

For example, the UE interested in group communication or the UE receiving group communication through single-cell multi-transmission may know physical layer cell identification information (PhysCellId) on a neighboring cell through a cell search. For example, the physical layer cell identification information may have a value ranging from 0 to 503. Thus, when the serving cell broadcasts the single-cell multi-transmission information on the neighboring cells through intra-cell system information, the UE may avoid reading the single-cell multi-transmission system information on the neighboring cell through this information.

For example, when the base station broadcasts information on mapping of single-cell multi-transmission (for example, TMGI, GRNTI, or identification/identity information on a group communication service/session/bearer) for a specified group service/session/bearer and cell identification information (for example, PhysCellId or CellIdentity) on a neighboring cell providing single-cell multi-transmission in the serving cell, the UE may know whether the neighboring cell provides single-cell multi-transmission for the specified group service/session/bearer through the physical layer cell identification information obtained (or determined) in a cell search process for a neighboring cell, without reading system information on the neighboring cell.

In another example for providing service continuity for the RRC-idle UE, when a cell to be reselected (reselected cell) provides single-cell multi-transmission for group communication, the RRC-idle UE, which is interested in the group communication or receives the group communication through single-cell multi-transmission, may assign the same priority as that of the current cell or the frequency of the current cell to the cell or the frequency of the cell in a cell reselection procedure. For example, even though the cell reselection priority of the frequency of the cell is lower than the priority of the frequency of the currently serving cell (or the cell before reselection), the UE may assign a cell reselection priority, which is the same as that of the frequency of the current cell, to the cell or the frequency of the cell. That is, the cell may be allowed to have a cell-specific reselection priority.

Alternatively, when a cell to be reselected (e.g., reselected cell) provides single-cell multi-transmission for group communication, the RRC-idle UE, which is interested in the group communication or receives the group communication through single-cell multi-transmission, may assign a top priority to the cell to be reselected, the frequency of the cell to be reselected or a single-cell multi-transmission providing frequency in a cell reselection procedure. For example, even if the cell reselection priority of the frequency of the cell or the single-cell multi-transmission providing frequency is lower than the priority of the frequency of the currently serving cell (or the cell before reselection), the UE may assign top cell reselection priority to the cell. That is, the cell may be allowed to have a cell-specific reselection priority.

Alternatively, when the current cell provides single-cell multi-transmission for group communication, the RRC-idle UE, which is interested in the group communication or receives the group communication through single-cell multi-transmission, may consider the cell or the frequency of the cell as a top priority.

Alternatively, when a reselected cell provides MBMS transmission for group communication, the RRC-idle UE, which is interested in the group communication or receives the group communication through single-cell multi-transmission, may consider the cell providing an MBMS service as a top priority.

When a frequency-specific cell reselection priority is assigned per frequency, if the UE is receiving an MBMS service or is interested in receiving an MBMS service and it is possible to receive an MBMS service while the UE camps on an MBMS-service-providing frequency, the UE may consider this frequency as a top-priority frequency in an MBMS session. When single-cell multi-transmission is used, however, cells/base stations may operate independently even though using the same frequency. Further, a single-cell multi-transmission region may not be configured according to a frequency. Thus, although a serving cell frequency provides single-cell multi-transmission, if this frequency is configured to be considered as a top priority, it may be rather likely that a cell not providing corresponding group communication is reselected. As described above, the embodiments of the present disclosure may solve this problem by adjusting a priority for a cell providing single-cell multi-transmission or a cell currently receiving data through single-cell multi-transmission.

Meanwhile, specific embodiments are illustrated below in which a cell reselection priority is assigned for a cell providing single-cell multi-transmission or a cell providing a specified group communication service in which the UE is interested through single-cell multi-transmission in the foregoing cell reselection procedure.

For example, when a UE interested in group communication does not receive single-cell multi-transmission, if a neighboring cell provides single-cell multi-transmission for the group communication, the UE may consider the cell providing single-cell multi-transmission as a top priority. Thus, when the cell satisfies Squal>Threshx,HighQ or Squal>Threshx,HighP during a time interval Treselection, the UE may reselect the neighboring cell having a comparatively higher priority in a cell reselection procedure. Here, Threshx, HighQ and Threshx,HighP denote preset thresholds, and Squal denotes a value representing a cell reselection quality (see 3GPP TS. 36.304, Section 5.2).

In another example, when a UE interested in group communication does not receive single-cell multi-transmission, if a neighboring cell provides single-cell multi-transmission for the group communication, the UE may consider the frequency of the cell providing single-cell multi-transmission as a top priority. Thus, when the cell having a higher-priority frequency satisfies Squal>Threshx,HighQ or Squal>Threshx,HighP during a time interval Treselection, the UE may reselect the neighboring cell on a higher-priority frequency than the current cell.

In still another example, when a UE interested in group communication is receiving the group communication through single-cell multi-transmission, if a neighboring cell provides single-cell multi-transmission for the group communication, the UE may consider the cell providing single-cell multi-transmission as a top priority. Thus, when the cell satisfies Squal>Threshx,HighQ or Squal>Threshx,HighP during a time interval Treselection, the UE may reselect the neighboring cell having a higher priority.

In yet another example, when a UE interested in group communication is receiving the group communication through single-cell multi-transmission, if a neighboring cell provides single-cell multi-transmission for the group communication, the UE may consider the cell providing single-cell multi-transmission as the same priority as that of the current cell. Thus, the UE may perform cell reselection based on the ranking of the cell or the RSRP measurement of the cell.

In still another example, when a UE interested in group communication is receiving the group communication through single-cell multi-transmission, if a neighboring cell provides single-cell multi-transmission for the group communication, the UE may consider the frequency of the cell providing single-cell multi-transmission to have the same priority as that of the frequency of the current cell. Thus, the UE may perform cell reselection based on a ranking with respect to the cell or the frequency of the cell including the frequency of the current cell or based on the RSRP measurement of the cell.

Meanwhile, to maintain service continuity, when the UE recognizes that the target neighboring cell does not support single-cell multi-transmission through the single-cell multi-transmission system information on the neighboring cell, the control information associated with the single-cell multi-transmission system information, or the control information for identifying whether the neighboring cell supports single-cell multi-transmission while staying in the source cell (or current cell or cell on which the UE camps), the UE may request service through unicast through the GCS AS. For example, the RRC-idle UE may establish an RRC connection and then may request the service through unicast through the GCS AS.

Hereinafter, the assignment of the-RNTI of the present disclosure is described.

For example, the G-RNTI may be one of currently reserved RNTI values, FFF4-FFFC.

In another example, the G-RNTI may be 0001-003C or 003D-FFF3.

In still another example, in the case of assigning a G-RNTI for use among a plurality of values, when assigning a G-RNTI to provide a specified group communication service/session/bearer, the base station may assign or select the G-RNTI through coordination with the BM-SC or the GCS AS. Accordingly, it is possible to assign a G-RNTI for a specified group communication service/session/bearer to prevent a collision with other base stations or other cells.

According to yet another example, in the case of assigning a G-RNTI for use among a plurality of values, when assigning a G-RNTI to provide a specified group communication service/session/bearer, each base station may independently assign the G-RNTI, and may assign or select the G-RNTI through coordination if any collision occurs.

According to still another example, in the case of assigning a G-RNTI for use among a plurality of values, when assigning a G-RNTI to provide a specified group communication service/session/bearer, the base station may assign or select the G-RNTI through coordination between base stations. To this end, X2 signaling may be needed.

According to yet another example, in the case of assigning a G-RNTI for use among a plurality of values, when assigning a G-RNTI to provide a specified group communication service/session/bearer, the base station may calculate and assign the G-RNTI based on an associated TMGI. The UE may also calculate and use a G-RNTI based on the TMGI received through an application server (for example, GCS AS or BM-SC) or configured in advance.

According to still another example, in the case of assigning a G-RNTI for use among a plurality of values, when assigning a G-RNTI to provide a specified group communication service/session/bearer, the base station may calculate and assign the G-RNTI based on associated identification information to identify the specified group communication service/session/bearer. The UE may also calculate and use a G-RNTI based on the identification information to identify the specified group communication service/session/bearer received through an application server (for example, GCS AS or BM-SC) or configured in advance.

According to yet another example, in the case of assigning a G-RNTI for use among a plurality of values, the base station may designate one RNTI (hereinafter, SC-RNTI) to broadcast, to the UE, single-cell multi-transmission control information including the G-RNTI of a specified group communication service/session/bearer. The UE may receive the single-cell multi-transmission control information, indicated using the SC-RNTI on a PDCCH, on a PDSCH. Further, the UE may recognize the G-RNTI associated with the specified group communication service/session/bearer through the single-cell multi-transmission control information.

The embodiments of the present disclosure may be provided separately or in combination.

Accordingly, the present disclosure may provide a continuous service through a PDSCH radio resource shared between UEs in a specified group in one cell, reducing service interruptions, even though a cell change occurs due to the movement of a UE receiving downlink multicast/group cast/group communication data.

Figure 7:
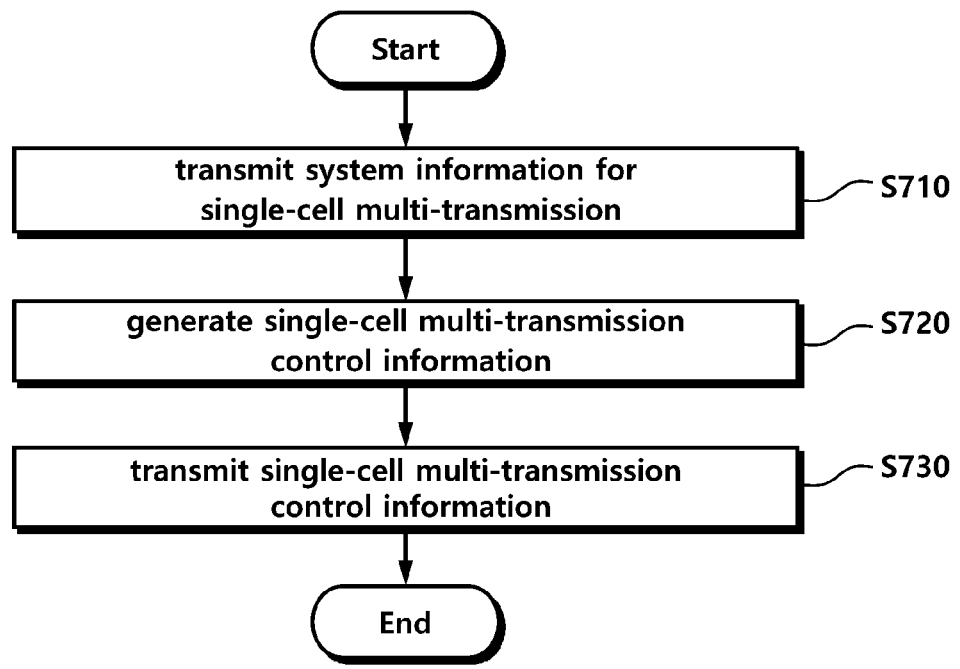
FIG. 7 illustrates an operation of a base station according to one embodiment of the present disclosure.

FIG. 7 illustrates operations of a base station according to one embodiment of the present disclosure.

In accordance with at least one embodiment of the present disclosure, a method of a base station may be provided for transmitting single-cell multi-transmission data. The method includes transmitting system information for single-cell multi-transmission in a primary cell (PCell); generating single-cell multi-transmission control information; and transmitting the single-cell multi-transmission control information to a UE in the PCell.

Referring to FIG. 7, the base station may transmit system information for single-cell multi-transmission in a PCell (S710). For example, the base station may transmit system information for single-cell multi-transmission through the PCell configured for the UE, and the UE may receive the system information for single-cell multi-transmission. For example, the base station may broadcast information on single-cell multi-transmission through the system information. Specifically, the base station may broadcast a G-RNTI through the system information. Alternatively, the base station may broadcast a TMGI and a G-RNTI associated with the TMGI through the system information. Alternatively, the base station may broadcast identification information to identify a downlink service/session/bearer of a group communication service/session/bearer and a G-RNTI associated with the identification information through the system information. In another example, the base station may broadcast information for receiving single-cell multi-transmission control information including a G-RNTI through the system information. Alternatively, the base station may broadcast information for receiving single-cell multi-transmission control information including a TMGI and a G-RNTI associated with the TMGI through the system information. Alternatively, the base station may broadcast information for receiving single-cell multi-transmission control information including identification information to identify a downlink service/session/bearer of a group communication service/session/bearer and a G-RNTI associated with the identification information through the system information.

Further, the base station may generate single-cell multi-transmission control information (S720). The single-cell multi-transmission control information may include information on a neighboring cell providing single-cell multi-transmission. Alternatively, the single-cell multi-transmission control information may include information on a group communication service provided by each cell. Alternatively, the single-cell multi-transmission control information may include information on correspondence between a group communication service and a cell. For example, the single-cell multi-transmission control information may include at least one of cell identification information on a neighboring cell providing single-cell multi-transmission, a TMGI, and information on a neighboring cell providing single-cell multi-transmission associated with a G-RNTI.

Further, the base station may transmit the single-cell multi-transmission control information to a UE in the PCell (S730). The single-cell multi-transmission control information may be transmitted at a time scheduled by the system information for single-cell multi-transmission. For example, the base station may include scheduling information, such as a period for receiving the control information and offset information, in the system information and may transmit the control information according to the scheduling information. The single-cell multi-transmission control information may be indicated through a PDCCH. Accordingly, the UE may acquire information on a neighboring cell providing a group communication service of interest. In addition, the UE may identify information on a neighboring cell providing single-cell multi-transmission.

Meanwhile, the UE may identify whether the neighboring cell provides single-cell multi-transmission using the received single-cell multi-transmission control information. Alternatively, the UE may identify what kind of group communication service the neighboring cell provides. Alternatively, the UE may identify a neighboring cell providing a group communication service that the UE is interested in. Alternatively, the UE may identify a cell providing single-cell multi-transmission. Accordingly, although not checking system information on the neighboring cell, the UE may identify whether the neighboring cell provides single-cell multi-transmission or whether the neighboring cell provides a group communication service that the UE is interested in.

The UE may assign a top priority to the frequency of a cell providing single-cell multi-transmission to use the frequency in a cell reselection procedure. Alternatively, the UE may assign a priority for the cell according to the embodiment of assigning a cell reselection priority in a cell reselection procedure and may perform a cell reselection procedure according to the priority.

Accordingly, the base station may allow the RRC-idle UE to identify through the serving cell whether the neighboring cell provides single-cell multi-transmission, without identifying whether the neighboring cell provides single-cell multi-transmission using system information or control information on the neighboring cell. Further, the UE may assign a top priority to the frequency of a cell providing single-cell multi-transmission, thereby being continuously provided with a group communication service even in cell reselection.

Configurations of a UE and a base station are briefly described, hereinafter.

Figure 8:
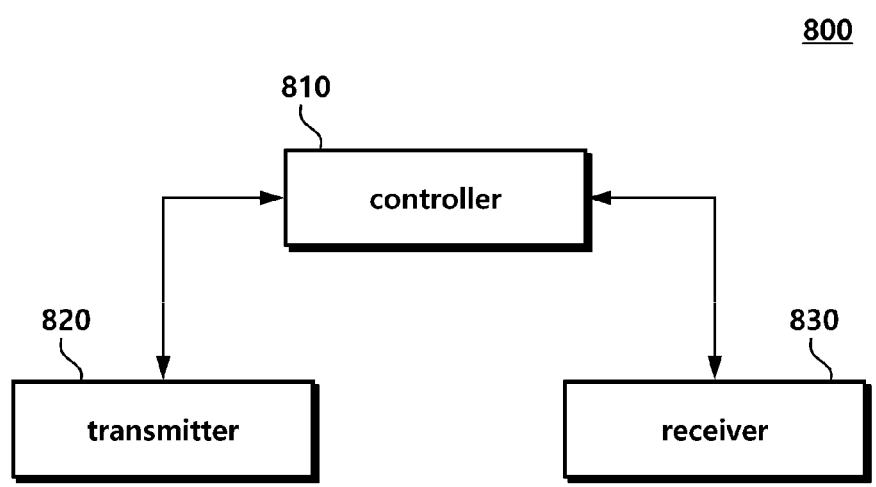
FIG. 8 illustrates a configuration of a UE according to one embodiment of the present disclosure.

FIG. 8 illustrates a configuration of a UE according to one embodiment of the present disclosure.

Referring to FIG. 8, the UE 800 for receiving single-cell multi-transmission data includes a receiver 830 configured to receive system information for single-cell multi-transmission in a primary cell and to receive single-cell multi-transmission control information in the primary cell, and a controller 810 configured to identify whether a neighboring cell provides single-cell multi-transmission using the single-cell multi-transmission control information.

Further, the receiver 830 may receive single-cell multi-transmission control information indicated through a PDCCH. The single-cell multi-transmission control information may include at least one of cell identification information on a neighboring cell providing single-cell multi-transmission, a TMGI, and information on a neighboring cell providing single-cell multi-transmission associated with a G-RNTI. The single-cell multi-transmission control information may be scheduled based on the system information. In addition, the receiver 830 receives downlink control information, data and messages from the base station through a corresponding channel.

Further, the controller 810 may assign a top priority to the frequency of a cell providing single-cell multi-transmission to perform a cell reselection procedure.

In addition, the controller 810 controls the overall operation of the UE 800 necessary to perform the embodiments of the present disclosure in receiving downlink multicast/group cast/group communication data through a PDSCH or in receiving multicast/group cast/group communication data through a PDSCH, minimizing service interruptions occurring by the cell-to-cell movement of the RRC-idle UE.

Meanwhile, a transmitter 820 may transmit information for a request to receive a group communication service through unicast when the neighboring cell does not provide single-cell multi-transmission. The information for the request may be transmitted to a serving cell, the neighboring cell, or a GCS AS. In addition, the transmitter 820 transmits uplink control information, data, and messages to the base station through a corresponding channel.

Figure 9:
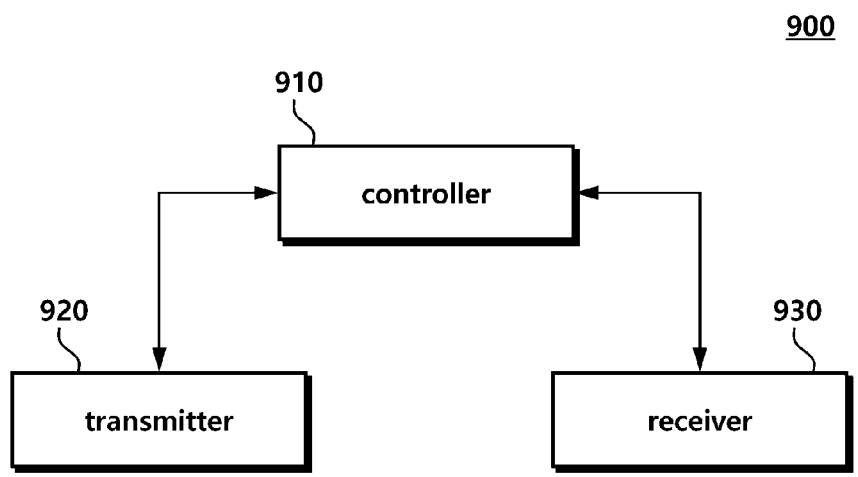
FIG. 9 illustrates a configuration of a base station according to one embodiment of the present disclosure.

FIG. 9 illustrates a configuration of a base station according to one embodiment of the present disclosure.

Referring to FIG. 9, the base station 900 may include a controller 910 configured to generate single-cell multi-transmission control information and a transmitter 920 configured to transmit system information for single-cell multi-transmission in a primary cell and to transmit the single-cell multi-transmission control information to a UE in the primary cell.

The transmitter 920 may indicate the transmission of the single-cell multi-transmission control information through a PDCCH. The single-cell multi-transmission control information may include at least one of cell identification information on a neighboring cell providing single-cell multi-transmission, a TMGI, and information on a neighboring cell providing single-cell multi-transmission associated with a G-RNTI. The single-cell multi-transmission control information may be scheduled by the system information.

A receiver 930 may receive a request for a group communication service through unicast from the UE.

The controller 910 controls the overall operation of the base station 900 necessary to perform the embodiments of the present disclosure in transmitting downlink multicast/group cast/group communication data through a PDSCH or in transmitting multicast/group cast/group communication data through a PDSCH, minimizing service interruptions occurring by the cell-to-cell movement of the RRC-idle UE.

In addition, the transmitter 920 and the receiver 930 are used to transmit/receive signals, messages, and data necessary to perform the foregoing present disclosure to/from the UE.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method for receiving, by a user equipment (UE), single-cell multi-transmission data, the method comprising:
   receiving system information for single-cell multi-transmission in a primary cell (PCell), wherein the single-cell multi-transmission performs group communication through a Physical Downlink Shared Channel (PDSCH) radio resource shared with other UEs included in a same group in the primary cell;
   receiving single-cell multi-transmission control information in the primary cell, wherein the single-cell multi-transmission control information is information for controlling the single-cell multi-transmission; and
   identifying whether a neighboring cell provides the single-cell multi-transmission using the single-cell multi-transmission control information,
   wherein the single-cell multi-transmission control information comprises cell identification information on a neighboring cell providing the single-cell multi-transmission, group communication service identification information (Temporary Mobile Group Identity: TMGI) that the neighboring cell provides, and information on the neighboring cell providing the single-cell multi-transmission associated with group identification information (Group-Radio Network Temporary Identifier: G-RNTI), wherein the single-cell multi-transmission control information is indicated through a Physical Downlink Control Channel (PDCCH) and is scheduled by the system information, and wherein the method comprises requesting to receive a group communication service through unicast to one of a group communication service application server, a base station, and a broadcast/multicast server before a cell change to the neighboring cell when the neighboring cell does not provide single-cell multi-transmission.

2. The method as claimed in claim 1, further comprising performing a cell reselection procedure by assigning a top priority to a frequency of a cell providing single-cell multi-transmission.

3. A method for transmitting, by a base station, single-cell multi-transmission data, the method comprising:

transmitting system information for single-cell multi-transmission in a primary cell (PCell) wherein the single-cell multi-transmission performs group communication through a Physical Downlink Shared Channel (PDSCH) radio resource shared with UEs included in a same group in the primary cell;

generating single-cell multi-transmission control information for controlling the single-cell multi-transmission; and transmitting the single-cell multi-transmission control information to a user equipment (UE) in the primary cell, wherein the single-cell multi-transmission control information comprises cell identification information on a neighboring cell providing single-cell multi-transmission, group communication service identification information (Temporary Mobile Group Identity: TMGI) that the neighboring cell provides, and information on the neighboring cell providing single-cell multi-transmission associated with group identification information (Group-Radio Network Temporary Identifier: G-RNTI), wherein the single-cell multi-transmission control information is indicated through a Physical Downlink Control Channel (PDCCH) and is scheduled by the system information, and wherein user equipment (UE) identifies whether a neighboring cell provides single-cell multi-transmission using the single-cell multi-transmission control information and requests to receive a group communication service through unicast to one of a group communication service application server, the base station, and a broadcast/multicast server before a cell change to the neighboring cell when the neighboring cell is identified as not providing single-cell multi-transmission.

4. The method as claimed in claim 3, wherein user equipment (UE) performs a cell reselection procedure by assigning a top priority to a frequency of a cell providing single-cell multi-transmission.

5. A user equipment (UE) for receiving single-cell multi-transmission data, the UE comprising:

a receiver configured to receive system information for single-cell multi-transmission in a primary cell (PCell) and to receive single-cell multi-transmission control information in the primary cell, wherein the single-cell multi-transmission performs group communication through a Physical Downlink Shared Channel (PDSCH) radio resource shared with other UEs included in a same group in the primary cell and the single-cell multi-transmission control information is information for controlling the single-cell multi-transmission; and a controller configured to identify whether a neighboring cell provides single-cell multi-transmission using the single-cell multi-transmission control information, wherein the single-cell multi-transmission control information comprises cell identification information on a neighboring cell providing single-cell multi-transmission, group communication service identification information (Temporary Mobile Group Identity: TMGI) that the neighboring cell provides, and information on the neighboring cell providing single-cell multi-transmission associated with group identification information (Group-Radio Network Temporary Identifier: G-RNTI), wherein the single-cell multi-transmission control information is indicated through a Physical Downlink Control Channel (PDCCH) and is scheduled by the system information, and wherein the method comprises requesting to receive a group communication service through unicast to one of a group communication service application server, a base station, and a broadcast/multicast server before a cell change to the neighboring cell when the neighboring cell does not provide single-cell multi-transmission.

6. The UE as claimed in claim 5, wherein the controller performs a cell reselection procedure by assigning a top priority to a frequency of a cell providing single-cell multi-transmission.

\* \* \* \* \*